(12) United States Patent
Petrovic et al.

(10) Patent No.: US 8,615,061 B2
(45) Date of Patent: Dec. 24, 2013

(54) METHOD AND APPARATUS FOR CROSS POLARIZATION AND CROSS SATELLITE INTERFERENCE CANCELLATION

(75) Inventors: Branislav Petrovic, La Jolla, CA (US); Michail Tsatsanis, Huntington Beach, CA (US)

(73) Assignee: Entropic Communications, Inc., San Diego, CA (US)

( * ) Notice: Subject to any disclaimer, the term of this patent is extended or adjusted under 35 U.S.C. 154(b) by 78 days.

(21) Appl. No.: 13/192,821

(22) Filed: Jul. 28, 2011

(65) Prior Publication Data

US 2012/0027141 A1   Feb. 2, 2012

Related U.S. Application Data

(60) Provisional application No. 61/368,795, filed on Jul. 29, 2010.

(51) Int. Cl.
*H04B 1/10* (2006.01)
(52) U.S. Cl.
USPC .......................... 375/350; 375/346; 375/316
(58) Field of Classification Search
USPC .......................................... 375/350, 346, 316
See application file for complete search history.

(56) References Cited

U.S. PATENT DOCUMENTS

| 5,416,799 A | 5/1995 | Currivan et al. |
| 6,088,341 A | 7/2000 | Hinedi et al. |
| 2008/0205633 A1 | 8/2008 | Dyba et al. |
| 2009/0073039 A1 | 3/2009 | Rideout et al. |

OTHER PUBLICATIONS

Wikipedia, the free encyclopedia; Least mean squares filter; Apr. 6, 2011.
Earl R. Ferrara, Jr.; Bernard Widrow; The Time-Sequenced Adaptive Filter; IEEE Transactions on Circuits and Systems, vol. CAS-28, No. 6, Jun. 1981, p. 519-523.

*Primary Examiner* — Michael Neff
(74) *Attorney, Agent, or Firm* — Bruce Greenhaus; Richard Bachand; Sheppard Mullin Richter & Hampton LLP

(57) ABSTRACT

A method and apparatus in which a Tap-Weight Computer (TWC) calculates a Tap-Weight Vector (TWV) are provided. The TWV is coupled to a register in an adaptive filter module. Each adaptive filter module includes several adaptive filters that each include a tapped delay line. The input to the tapped delay line is one of a plurality of potential interfering signals. The TWV controls the weighting of the outputs from the taps off the delay line. The weighted outputs from each tapped delay line are subtracted from a received signal which potentially includes interference from the potential interfering signals. The TWC is multiplexed to each of the plurality of adaptive filters so that each adaptive filter is loaded with a TWV calculated by the TWC to reduce the amount of interference contributed by a particular potential interfering signal coupled to an input to that particular adaptive filter.

4 Claims, 11 Drawing Sheets

METHOD AND APPARATUS FOR CROSS POLARIZATION AND CROSS SATELLITE INTERFERENCE CANCELLATION

CROSS REFERENCE TO RELATED APPLICATIONS

This application claims priority from U.S. provisional patent application No. 61/368,795, filed Jul. 29, 2010, which is assigned to the assignee hereof and incorporated herein by reference in its entirety.

FIELD

The disclosed method and apparatus relate to interference cancellation in communication systems. Some embodiments relate to cancellation of cross satellite and cross polarization interference.

BACKGROUND

Communications engineers face a number of challenges today, including maximizing the amount of information that can be communicated over the limited resources available. With limited frequencies available over which to communicate radio signals, and with the amount of information that people wish to communicate growing rapidly, it is important to use the available frequencies as efficiently as possible. In order to do so, it is necessary to provide means by which signal interference can be reduced to minimum levels in order to allow modulation of a maximum amount of information onto signals that are transmitted over those frequencies.

One area that has been of interest is that of satellite communications, especially satellite communications for delivery of media for consumer consumption, such as television signals, or the like. As the number of satellites increase, the spacing, or separation between satellites decreases, and the increase in demand for more and more content to be delivered from the same or multiple satellites, interference between the satellite signals has become an issue.

One type of interference is due to the reception of signals transmitted from a first satellite at the same frequency or frequencies as signals received from a second satellite. If a receiver receives both signals without being able to sufficiently discriminate between them, the signals will interfere with one another. This is commonly referred to as cross-satellite interference. The closer the spacing between the satellites, the more cross-satellite interference may occur. Conversely, the wider the antenna beam-width (which is equivalent to lower antenna gain, i.e. a smaller antenna dish size), the more potential cross-satellite interference.

Another type of interference is due to signals on a first polarization of a first satellite being transmitted at the same frequency as desired signals on a second polarization of the first satellite. If the receiver receives both and cannot sufficiently discriminate between the two, then each will interfere with the other. This is referred to cross-polarization interference.

One way by which cross satellite and cross polarization interference can be reduced is to put as much separation as possible between each pair of potentially interfering signals. Such separation may be, for example, by separating the signals by frequency, physical distance, or the like. However, separating signals in these ways can reduce the amount of information that can be transmitted between a transmitter and a receiver, because the efficiency with which information can be transmitted over the communication system may be diminished. Accordingly, it would be desirable to have effective means capable of reducing the amount of cross satellite and cross polarization interference.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

One embodiment of the presently disclosed method and apparatus provides a system in which a Tap-Weight Computer (TWC) calculates a Tap-Weight Vector (TWV) that is coupled to a register in each of a plurality of adaptive filters. Each such adaptive filter includes a tapped delay line. The input to the tapped delay line of each such adaptive filter is one of a plurality of a potential interfering signals. The TWV controls the weighting of the outputs from the taps off the delay line. The weighted output from the tapped delay line are then subtracted from a received signal which potentially includes interference from the potential interfering signals. The TWC is multiplexed to each of the plurality of adaptive filters so that each adaptive filter is loaded with a TWV calculated by the TWC to reduce the amount of interference contributed by a particular potential interfering signal coupled to an input to that particular adaptive filter.

Because the interference is relatively time insensitive (i.e., does not change significantly over short time intervals), the TWVs provided to each adaptive filter can be calculated one at a time while holding each of the other TWVs constant. Using several adaptive independent adaptive filters allows the length of the TWV to be relatively small, making it relatively simple to calculate the next TWV in the iterative process.

In one embodiment, the input to the delay line is a received signal that includes both the desired signal and one or more interfering signals from the same satellite or from other satellites. Each potentially interfering signal is weighted in accordance with the value of the TWV and subtracted from the received signal. An adaptive algorithm is used to determine whether the weighting is ideal and to determine how to adjust the weighting to improve the cancellation of the interference from each of the interfering signals.

Various embodiments of the disclosed method and apparatus for channel equalization are presented. Some of these embodiments are directed toward systems and methods for cross polarization and cross satellite interference cancellation in a satellite environment.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

In the various figures of the drawings, like reference numerals are used to denote like or similar parts.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
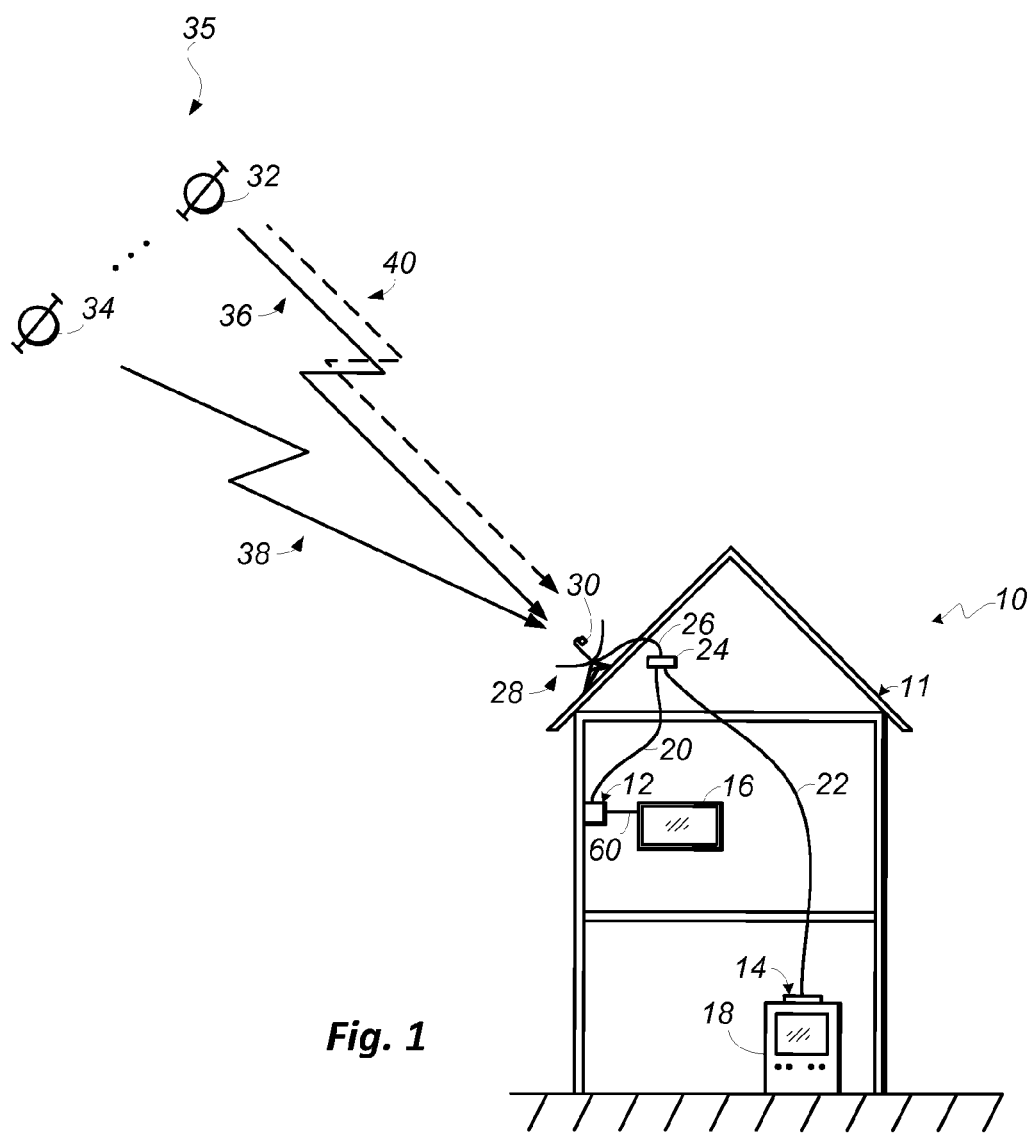
FIG. 1 is an illustrative example of an environment in which an adaptive filter module that is controlled by a tap-weight computer may be advantageously employed for reducing interference between a plurality of satellite signals.

One illustrative environment 10 of an environment in which an adaptive filter module that is controlled by a tap-weight computer may be advantageously employed for reducing interference between a plurality of satellite signals is shown in FIG. 1. The environment 10 is a typical home-cable-system installation; however, apparatuses and methods of the type described herein may be equally advantageously employed in many other environments, as well.

The environment 10 illustrates a system having two integrated receiver/decoder (IRD) devices 12 and 14. An IRD converts radio-frequency signals to a form that can be used in content displays, or the like. IRD devices include, for example, television tuner-receivers, single or twin tuner digital video recorders (DVRs), television receivers, single or multiple set-top boxes (STBs), servers that distributes video signals to client boxes that feed display devices, or the like. The IRDs 12 and 14 may be of conventional construction in order to operate in the cable distribution installation.

The IRDs 12 and 14 respectively receive intermediate frequency (IF) signals from an outdoor unit (ODU) 28 on cables 20 and 22 from a power divider 24. The power divider 24 is a two-way splitter which allows bi-directional passage of both RF and DC signals to feed a signal having combined user bands (UBs) to each IRDs 12 and 14 in one direction and to provide for the passing of command signals (for example DiSEqC™ signals of the type described by the CENELEC EN 50494 standard command structure) between the ODU 28 and IRDs 12 and 14 in the other direction. The power divider 24 receives its input signal from a cable 26, which is connected to the ODU 28, mounted, for example, on the roof or other appropriate location on the house 11. The cables 20, 22, and 26 may be of any suitable cable construction, such as a coaxial cable, plastic optical fiber (POF), or the like.

Typical ODUs include a parabolic dish or reflector and a low-noise block (LNB) 30 mounted on the feed of the dish. The LNB 30 may include an RF front-end, a multi-switch, and/or other signal processing and distribution equipment. The multi-switch and at least some of signal processing and distribution equipment may reside in a module remote from the LNB. The parabolic dish directs satellite microwave signals on which multiple television signals are encoded into the RF front end. These signals are encoded with multiple television signals in multiple channels, or transponders (typically 20-40 MHz wide each), over a very wide bandwidth (typically 500 MHz or 2 GHz wide bands). Also, the RF signals are received in two polarizations (vertical and horizontal, or left and right circular polarizations), effectively doubling the bandwidth.

The ODU 28 converts the received satellite microwave signals to a lower frequency over a smaller bandwidth that can be demodulated by an associated IRD. In traditional systems the RF is converted down to IF bands. In the example illustrated, the ODU 28 includes an LNB 30, which receives microwave signals from one or more satellites 32-34 in a satellite constellation 35. The LNB 30 includes circuitry to receive the satellite microwave signals and down-converts them to channels and frequency-stacks them to appropriate UBs for delivery on cables 20 and 22 to IRDs 12 and 14. This is referred to herein as "channelizing."

As mentioned above, cross-satellite interference is due to the reception of desired signals 36 transmitted from satellite 32 at the same frequency or frequencies as unwanted signals 38 received from the satellite 34 (and/or other satellites in the constellation, not shown). If a receiver receives both signals without being able to adequately discriminate between them, the signals will interfere with one another. Cross-polarization interference is due to unwanted signals 40 on a first polarization from satellite 32 being transmitted at the same frequency as the desired signals 36 on a second polarization from the satellite 32. If the receiver receives both and cannot adequately discriminate between the two, then each will interfere with the other.

Figure 2:
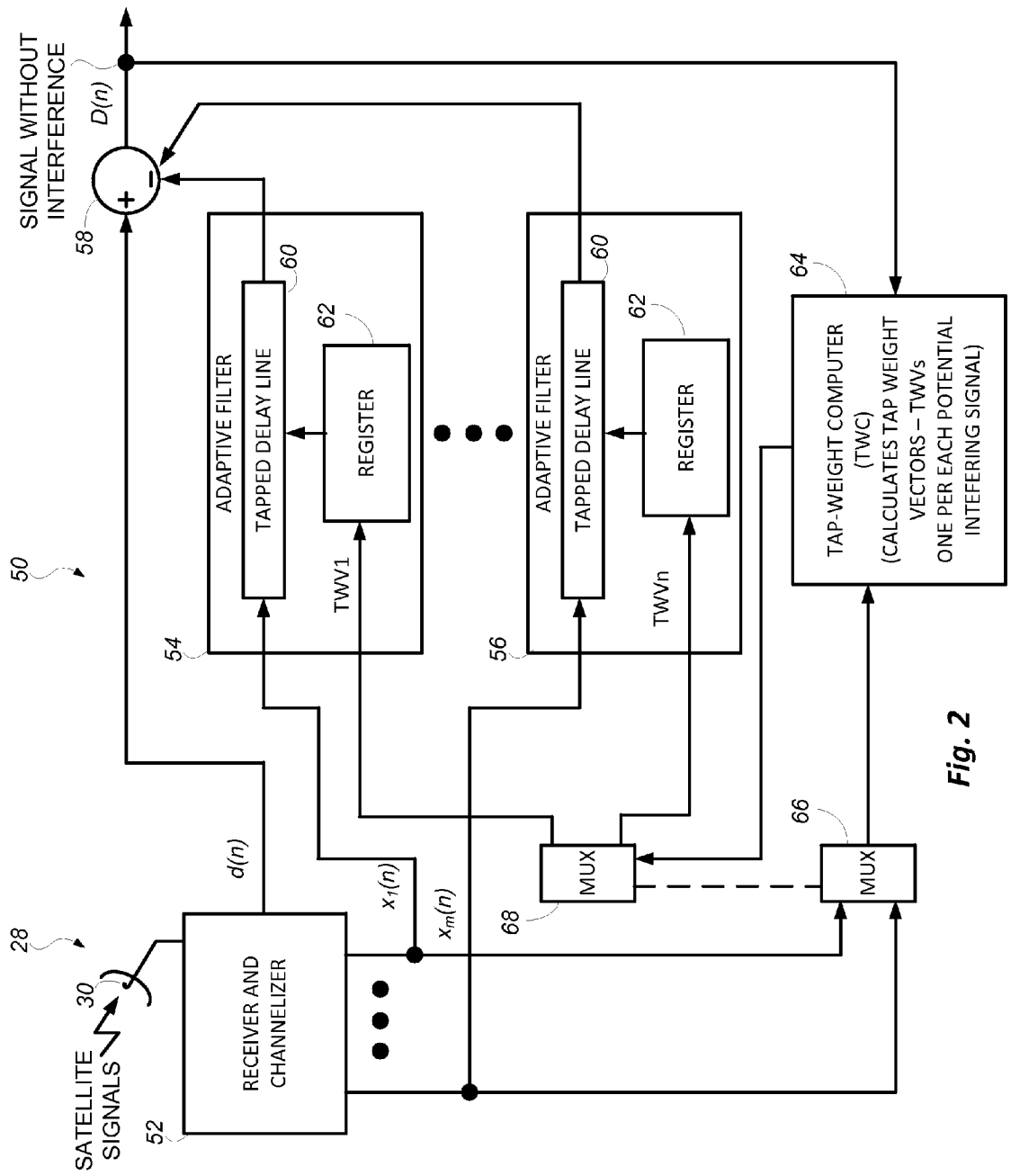
FIG. 2 is a high-level block diagram illustrating an embodiment of an adaptive filter module that is controlled by a tap-weight computer for reducing or eliminating interference among received satellite signals.

To address this issue, an example of an adaptive filter module that is controlled by a tap-weight computer 50, shown in FIG. 2, may be employed to substantially reduce or eliminate the interference among the received satellite signals, including cross polarization and cross satellite interference. The adaptive filter module that is controlled by a tap-weight computer 50 of FIG. 2 is a high-level block diagram, showing an instantiation of an adaptive filtering scheme applied to one of a plurality of channelized signals. Each of the channelized signals may represent respective channel data received from the satellites of the satellite constellation 35. In a typical installation, the adaptive filter module that is controlled by a tap-weight computer 50 would be replicated for each received channelized signal. Typically, the adaptive filter module that is controlled by a tap-weight computer 50 may be located in the LNB 30.

The adaptive filter module that is controlled by a tap-weight computer 50 receives and channelizes signals from the satellite constellation 35 by receiver and channelizer 52. The receiver and channelizer 50 produce a number of outputs, each corresponding to a signal of the satellite constellation 35. The output of the satellite signal from which the interference effects are to be removed is labeled d(n) and the potentially interfering satellite signals are labeled $x_1(n) \ldots x_m(n)$. Each of the potentially interfering satellite signals $x_1(n) \ldots x_m(n)$ are connected to a respective adaptive filter 54 . . . 56. The adaptive filters 54 . . . 56 produce an error-correcting value that is introduced into the desired signal d(n) by the interfering satellite signals $x_1(n) \ldots x_m(n)$, that is subtracted from the desired signal d(n) by a subtractor 58 to produce a circuit output signal D(n) that is substantially without interference.

Each of the adaptive filters 54 . . . 56 includes a tapped delay line 60 and a register 62. A tap-weight vector (TWV) is generated by a tap-weight computer (TWC) 64, in a manner described in greater detail. The TWC receives an input from the output signal D(n) and another input from the potentially interfering satellite signals $x_1(n) \ldots x_m(n)$, multiplexed in turn by a multiplexer 66 thereto. The TWVs generated by the TWC are multiplexed in turn to the registers 62 by a multiplexer 68, which is synchronized with the multiplexer 66. The TWVs serve to adjust the magnitude and phase errors of the respective potentially interfering satellite signals $x_1(n) \ldots x_m(n)$.

Figure 3:
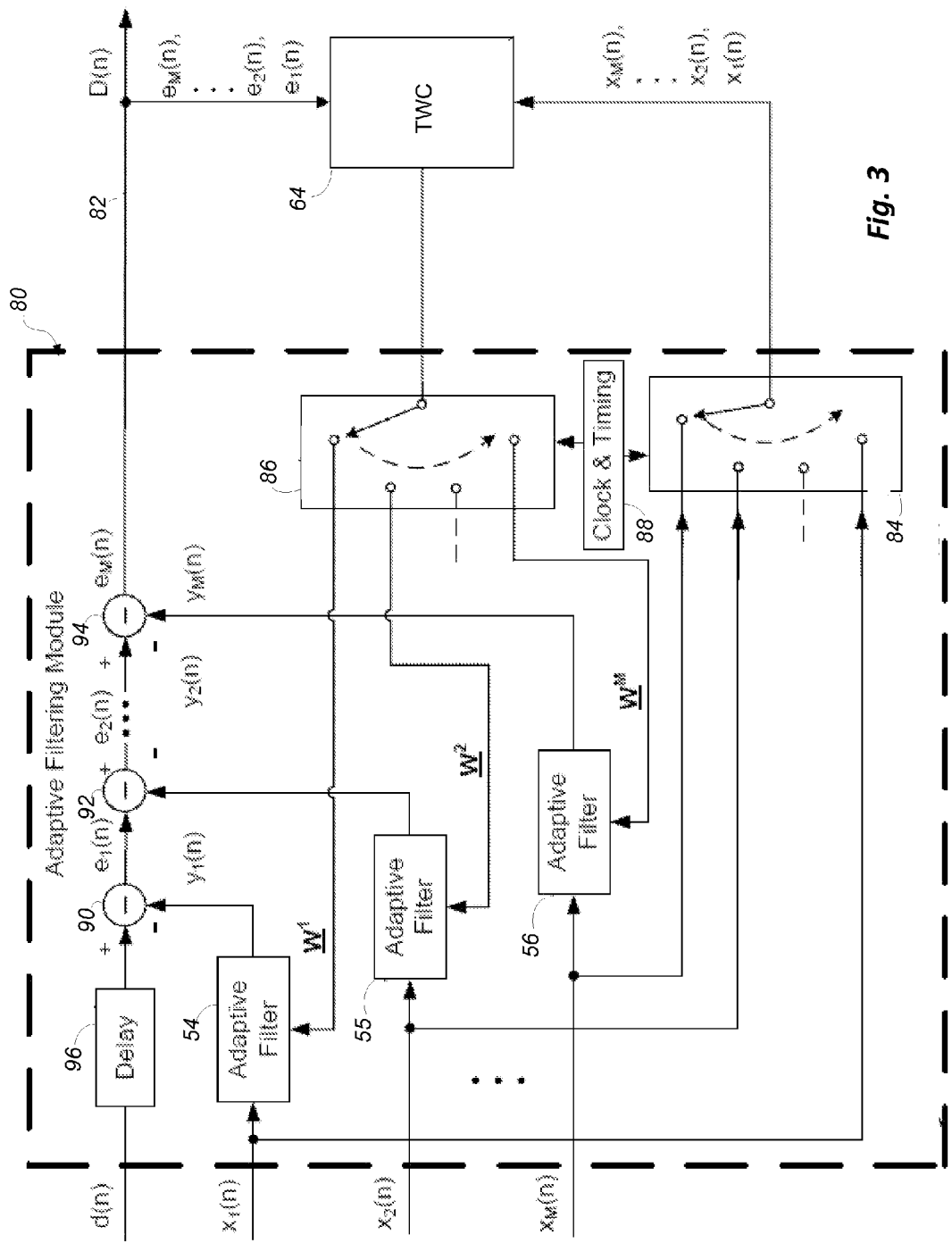
FIG. 3 is a block diagram illustrating additional aspects of the embodiment of an adaptive filter module that is controlled by a tap-weight computer of FIG. 2.

FIG. 3, to which reference is now additionally made, is a block diagram illustrating additional aspects of the embodiment of an adaptive filter module 80 that is controlled by a tap-weight computer 64 of FIG. 2. In FIG. 3, an adaptive filter module 80 uses the following signal nomenclature:

d(n) as the input desired signal with interference signals, $x_1(n), x_2(n), \ldots, x_M(n)$ as the interference signal inputs (i.e. digital samples), and D(n) as the output desired signal with cancelled interference signals.

The adaptive filter module 80 includes a plurality of adaptive filters 54, 55, . . . , 56. The adaptive filters 54, 55, . . . , 56 have respective output signals labeled $y_1(n), y_2(n), \ldots, y_M(n)$. Each of the adaptive filters 54, 55, . . . , 56 is optimized one at a time. That is, coefficients of each of the adaptive filters 54, 55, . . . , 56 are sequentially computed by a tap-weight computer (TWC) 64. The TWC 64 is connected to sequentially receive a respective one of the inputs $x_1(n), x_2(n), \ldots, x_M(n)$ by a multiplexer 84 to compute a "tap-weighting vector" (TWV), having components $W^1, W^2, \ldots, W^M$, for the adaptive filter to which the respective input signal $x_1(n), x_2(n), \ldots, x_M(n)$ is connected. Each TWV component $W^1, W^2, \ldots, W^M$, is calculated to adjust the coefficients of a respective adaptive filter 54, 55, . . . , 56 to result in the output D(n) 82 of the adaptive filter module 80 having a minimum error power. A least-mean-square (LMS) algorithm may be used to compute the TWV components $W^1, W^2, \ldots, W^M$ that carry the string of values of the coefficients of the adaptive filters 54, 55, . . . , 56. Other algorithms, such as "method of steepest descent," "recursive least square," "Newton's method," or the like, may also be used to determine the TWV. Once the coefficients of the adaptive filters 54, 55, . . . , 56 have been calculated, a TWV component $W^1, W^2, \ldots, W^M$, is routed via a multiplexer 86 to the corresponding adaptive filter 54, 55, . . . , 56. The multiplexers 84, . . . , 86 are synchronously operated by a clock and timing circuit 88.

The outputs $y_1(n), y_2(n), \ldots, y_M(n)$ of the adaptive filters 54, 55, . . . , 56 are subtracted from the input signal d(n) by subtractors 90, 92, . . . , 94, producing respective error-corrected signals $e_1(n), e_2(n), \ldots, e_M(n)$. The error-corrected signals $e_1(n), e_2(n), \ldots, e_M(n)$ are the residue values, i.e., the square value of one term at a time is being minimized. Thus, the error-corrected signals are:

$$e_1(n) = d(n) - y_1(n)$$

$$e_2(n) = e_1(n) - y_2(n),$$

$$\vdots$$

$$e_M(n) = e_M - 1(n) - y_M(n)$$
$$= d(n) - y_1(n) - y_2(n) - \ldots - y_M(n)$$
$$= D(n)$$

It should be noted that the error-corrected signals $e_1(n), e_2(n), \ldots, e_M(n)$ at the outputs of the subtractors 90, 92, . . . , 94 from individual adaptive filter 54, 55, . . . , 56 are not multiplexed. Rather the error-corrected signals are cascaded, providing a savings in multiplexers. This is possible because only one component of the composite error-corrected signal at a time is responsive to the corresponding filter coefficient adjustments.

In the circuit of FIG. 3, a delay circuit 96 provides a delay that approximately matches the delay in the adaptive filters 54, 55, . . . , 56. In one embodiment, the delay of the delay circuit 96 is preset as a design parameter. In another embodiment, the delay is programmable. The value of the delay can be set anywhere from zero to NT, where N is the length of an adaptive filter 54, 55, . . . , 56 and the T is the length of a clock cycle. A typical delay may be, for example, ½ NT (i.e. half the length of the adaptive filter). In the case in which satellite interference is being cancelled, the time delay between the desired signal and signals from interfering satellites is not expected to be sufficiently significant as to warrant delay values outside the length of the filter N. In other embodiments however, a larger delay may be warranted.

Figure 4:
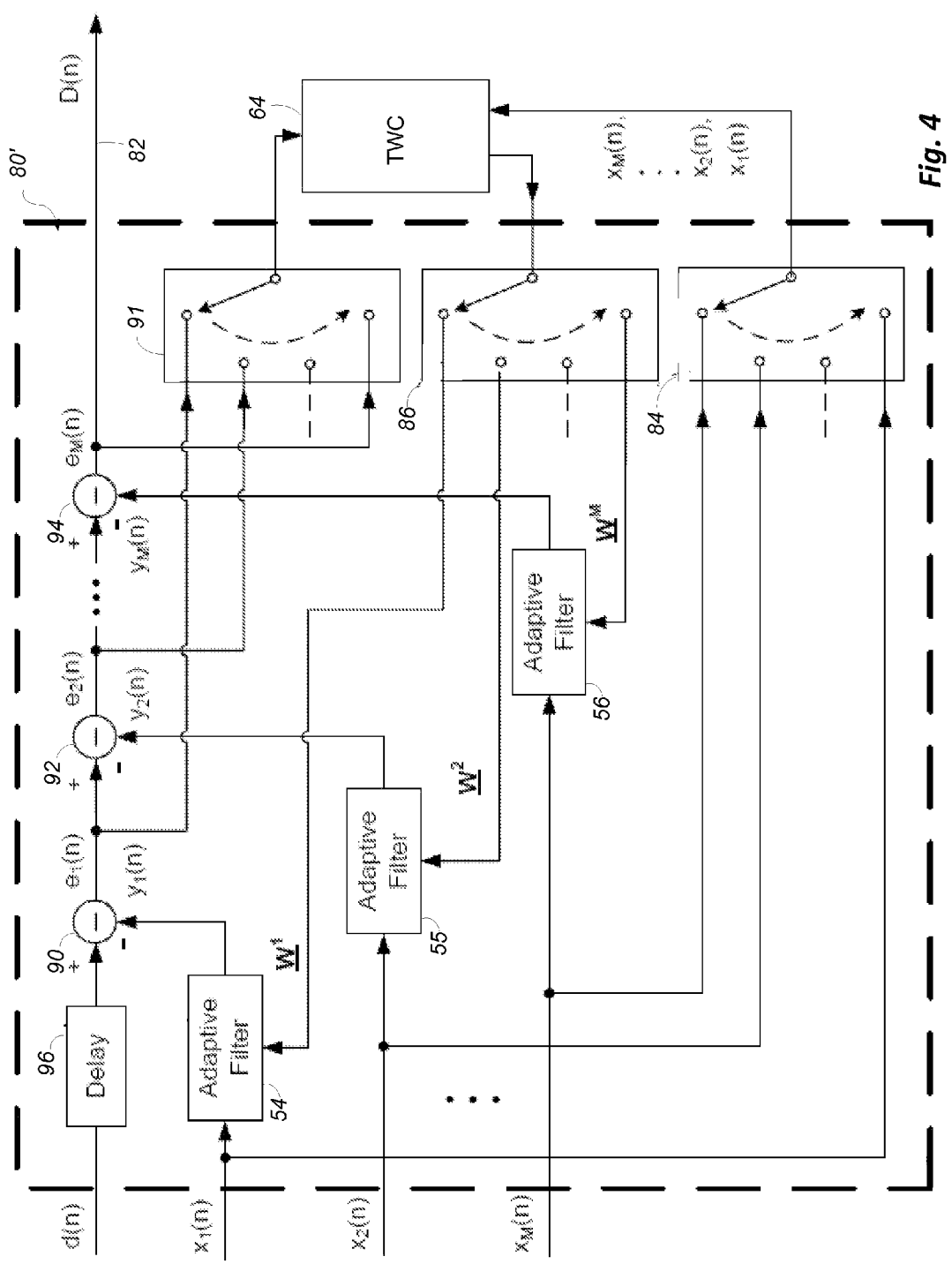
FIG. 4 is a block diagram illustrating another embodiment in which error-corrected signals are tapped at the output of each stage and routed to the computational block via a third multiplexer.

FIG. 4 shows another embodiment in which error-corrected signals $e_1(n), e_2(n), \ldots, e_M(n)$ in the adaptive filter module 80' are tapped at the output of each stage and routed to the computational block via a third multiplexer 91. All three multiplexers are synchronously operated. Clock and timing for the three multiplexers 84, . . . , 86 and 91 are not shown for the sake of simplicity.

Figure 5:
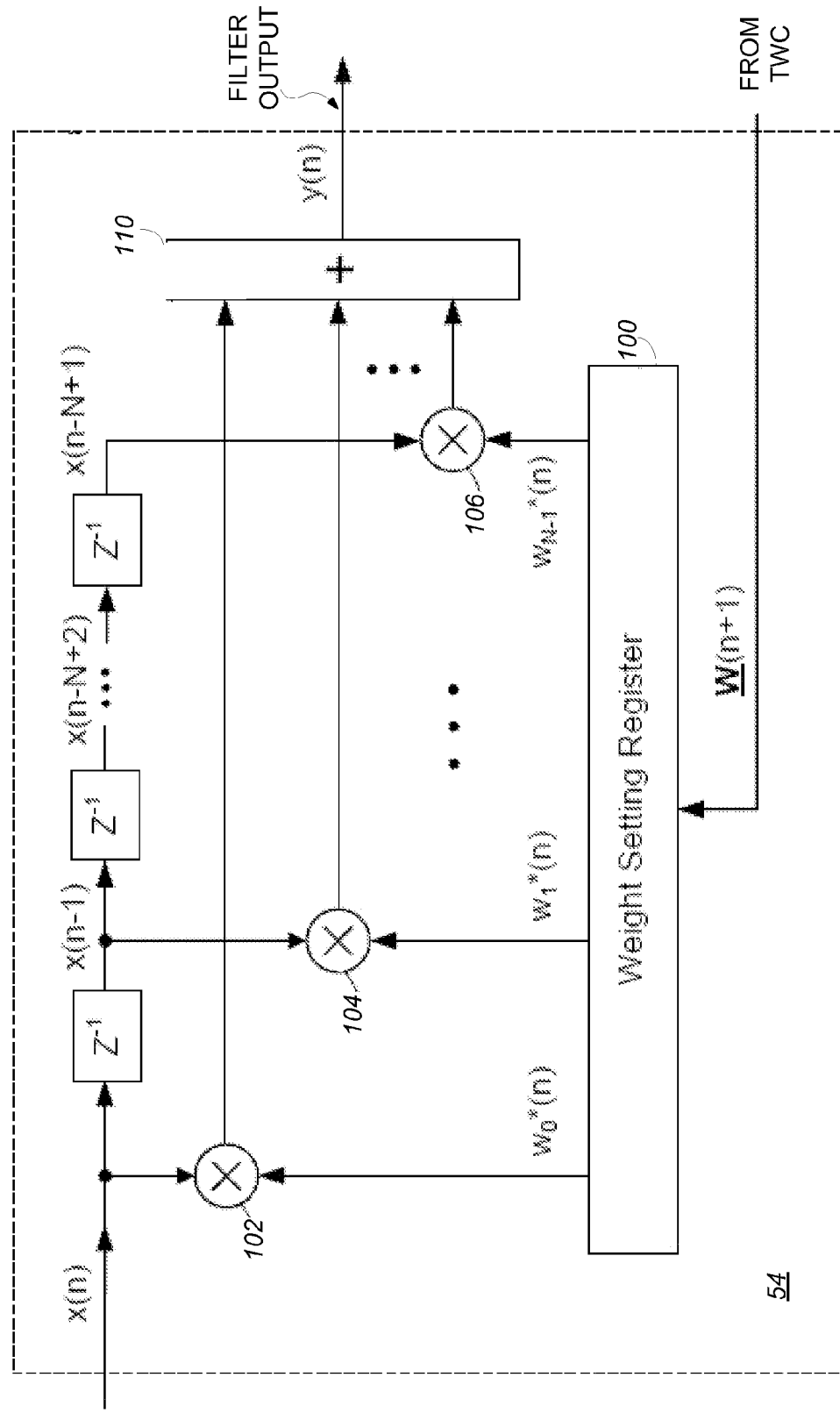
FIG. 5 is a block diagram illustrating details of an adaptive filter embodiment that may be used in the adaptive filter module that is controlled by a tap-weight computer of FIG. 2.

FIG. 5 shows the details of one of the adaptive filters 54, 55, . . . , 56, for example adaptive filter 54. The $Z^{-1}$ term denotes a delay by one clock cycle T. The TWV components $W^1, W^2, \ldots, W^M$ are stored by the TWC 64 in weight setting registers 100 in corresponding adaptive filters 54, 55, . . . , 56. Each TWV component $W^1, W^2, \ldots, W^M$ is then provided by the weight setting registers 100 to a plurality of weighting circuits 102, 104, . . . , 106 in each of the corresponding adaptive filters 54, 55, . . . , 56. Each of the weighting circuits 102, 104, . . . , 106 adjusts the amount of the signal x(n) at each delay point that is to be summed together in a summing circuit 110 based on the particular value of the TWV components $W^1, W^2, \ldots, W^M$ associated with that weighting circuit 102, 104, . . . , 106. Accordingly, the output signal y(n) is the weighted sum of the various delays of x(n):

In FIG. 5:

$$y(n) = w_0^*(n)x(n) + w_1^*(n)x(n-1) + \ldots + w_{N-1}^*(n)x(n-N+1);$$

$$W(n+1) = W(n) + 2\mu e^*(n)x(n);$$

where e(n) is the residue error-corrected value,

μ>0 is the adaptation step size, where typical values are between $2^{-9}$ to $2^{-6}$ (design parameter, programmable), $W(n)=[w_0(n), \underline{w}_1(n), \ldots, \underline{w}_{N-1}(n)]$ is the tap-weight vector value at time n, and $\underline{W}(n+1)$ is the tap-weight vector next value at time n+1, and where W is generalized representation of vectors $\underline{W}^1$, $\underline{W}^2, \ldots, \underline{W}^M$.

It should be noted that in FIG. 3, the individual components ($W^1, W^2, \ldots, W^M$) of the TVW are represented, and in FIG. 5, only one of the vector components is shown as an input to the weight setting register 100, having its own complex composition.

In general, all terms in above equations are complex; the asterisk (*) denotes "conjugate complex number". All multipliers are complex, as is the case when the signals are complex (I, Q), such as with zero-IF or direct down conversion in preceding stages. In most cases, the I and Q signals are sent on separate wires; however, in some embodiments, the I and Q signals can be multiplexed using sophisticated timing to synchronize with the samples of the desired signals. There is a special case when all quantities above are real, as may be the case with real IF (not I, Q), e.g. with Low IF In one embodiment in which only phase and amplitude of cancelling signal needs to be adjusted, an adaptive filter of length N=1 may be used, degenerating to a single weight coefficient $w_0(n)$, which can be realized with a single complex multiplier.

In one embodiment, the weight coefficients (i.e., the TWV components $W^1, W^2, \ldots, W^M$) are incremented (updated) only after P number of samples, averaging the values over P clock cycles to reduce the noise in the error-corrected signal and improve the resolution. P is a programmable integer number in the range from 1 to 100 or more. A sliding window can be used in which one or more of the oldest sample from among the P samples is dropped and the newest added to the P samples to be averaged.

Figure 6:
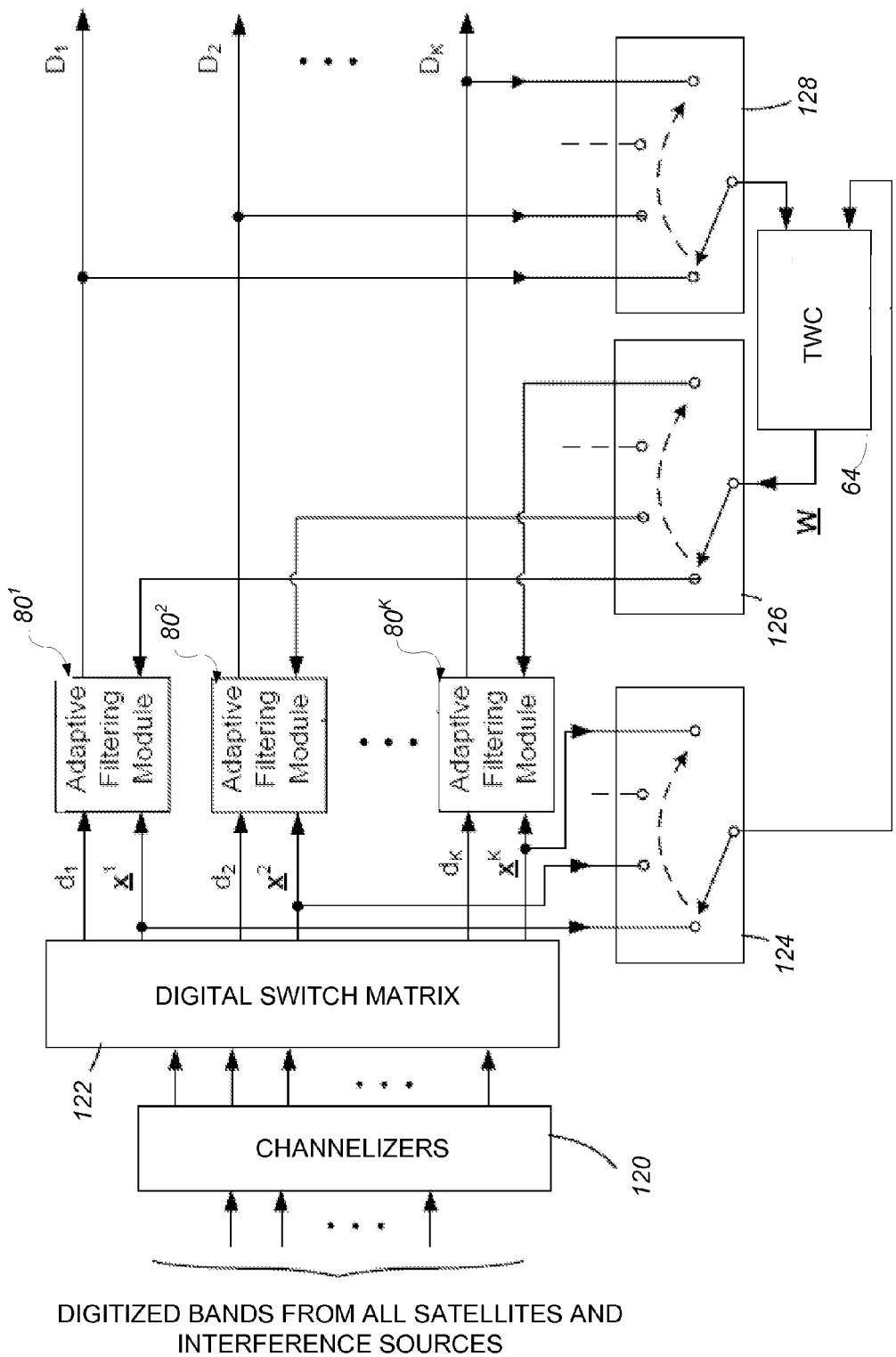
FIG. 6 is a block diagram illustrating an embodiment of the disclosed method and apparatus in which interference is cancelled from a plurality of desired signals.

FIG. 6 shows an embodiment of the disclosed method and apparatus in which interference is cancelled from a plurality of desired signals. The desired signals (with the associated interference) are designated as $d_1, d_2, \ldots, d_K$. The desired outputs with cancelled interference are designated as $D_1$, $D_2, \ldots, D_K$. The interference associated with each desired signal $d_1, d_2, \ldots, d_K$ is cancelled by a signal generated in a respective one of a plurality of adaptive filter modules $80^1$, $80^2, \ldots, 80^K$. In the example shown in FIG. 6, K different adaptive filter modules $80^1, 80^2, \ldots, 80^K$ are shown, where K is a variable having an integer value.

In the embodiment shown, digitized bands from all satellites and interference sources are channelized by channelizers 120 to extract all of the desired channels $d_1, d_2, \ldots, d_K$ and all of the interfering channel vectors $\underline{x}_1(n), \underline{x}_2(n), \ldots, \underline{x}_M(n)$ (for example satellite transponders) and output them to a switch matrix 122. The channelizers 120, however, are optional. In another embodiment, the entire band of desired and interfering signals may be processed, without channelization into individual channels.

The interference vectors $\underline{x}^i=[\underline{x}_{1i}, \underline{x}_{2i}, \ldots, \underline{x}_{Mi}]$, i=1, 2, 3, ..., K include a multiplicity of interfering signals $\underline{x}(n)$, as formulated below:

$$\underline{x}^1(n) = [x_{11}(n), x_{21}(n), \ldots, x_{M1}(n)]$$

$$\underline{x}^2(n) = [x_{12}(n), x_{22}(n), \ldots, x_{M2}(n)]$$

$$\vdots$$

$$\underline{x}^K(n) = [x_{1K}(n), x_{2K}(n), \ldots, x_{MK}(n)]$$

where in $x_{ji}(n)$, (j=1, 2, 3, ..., M; i=1, 2, 3, ..., K) are digital samples of interfering signals, e.g. from adjacent satellite transponders. While these signals interfere into desired signals $d_i(n)$, they may at the same time be also the desired signals, i.e. one or more of the $d_i(n)$ signals that are processed in other filtering modules $80^1, 80^2, \ldots, 80^K$.

Each of the K different adaptive filter modules $80^1$, $80^2, \ldots, 80^K$ share one TWC 64. Interference signal vectors $\underline{x}^1, \underline{x}^2, \ldots, \underline{x}^K$, are of different lengths where there are K adaptive filter modules $80^1, 80^2, \ldots, 80^K$ used. That is, each interference signal vector $\underline{x}^1, \underline{x}^2, \ldots, \underline{x}^K$ comprises a set of interfering signals, the length M of each vector indicating the number of such interfering signals in the vector. Accordingly, the vector $\underline{x}^i=[\underline{x}_{1i}, \underline{x}_{2i}, \ldots, \underline{x}_{Mi}]$; where i=1, 2, ..., K. All terms (x) in this equation are a function of n (sample time), which is not shown for simplicity.

Three multiplexers 124, 126, and 128 provide an example of one embodiment by which the TWC 64 may be shared among the plurality of adaptive filter modules $80^1, 80^2, \ldots, 80^K$. As can be seen in FIG. 6, the interference vectors $\underline{x}_{1i}$, $\underline{x}_{2i}, \ldots, \underline{x}_{Mi}$ that are applied to each adaptive filter module $80^1$, $80^2, \ldots, 80^K$ are coupled to the TWC 64 through the first multiplexer 124. The TWV components $W^1, W^2, \ldots, W^M$ are coupled to each of the adaptive filter modules $80^1, 80^2, \ldots$, $80^K$ through the second multiplexer 126. The outputs $D_1$, $D_2, \ldots, D_K$ from each adaptive filter module $80^1, 80^2, \ldots, 80^K$ are then coupled back to the TWC 64 in order to allow the TWC 64 to determine whether further correction to the TWV components $W^1, W^2, \ldots, W^M$ is required (i.e., whether minimum error power has been achieved).

Figure 7:
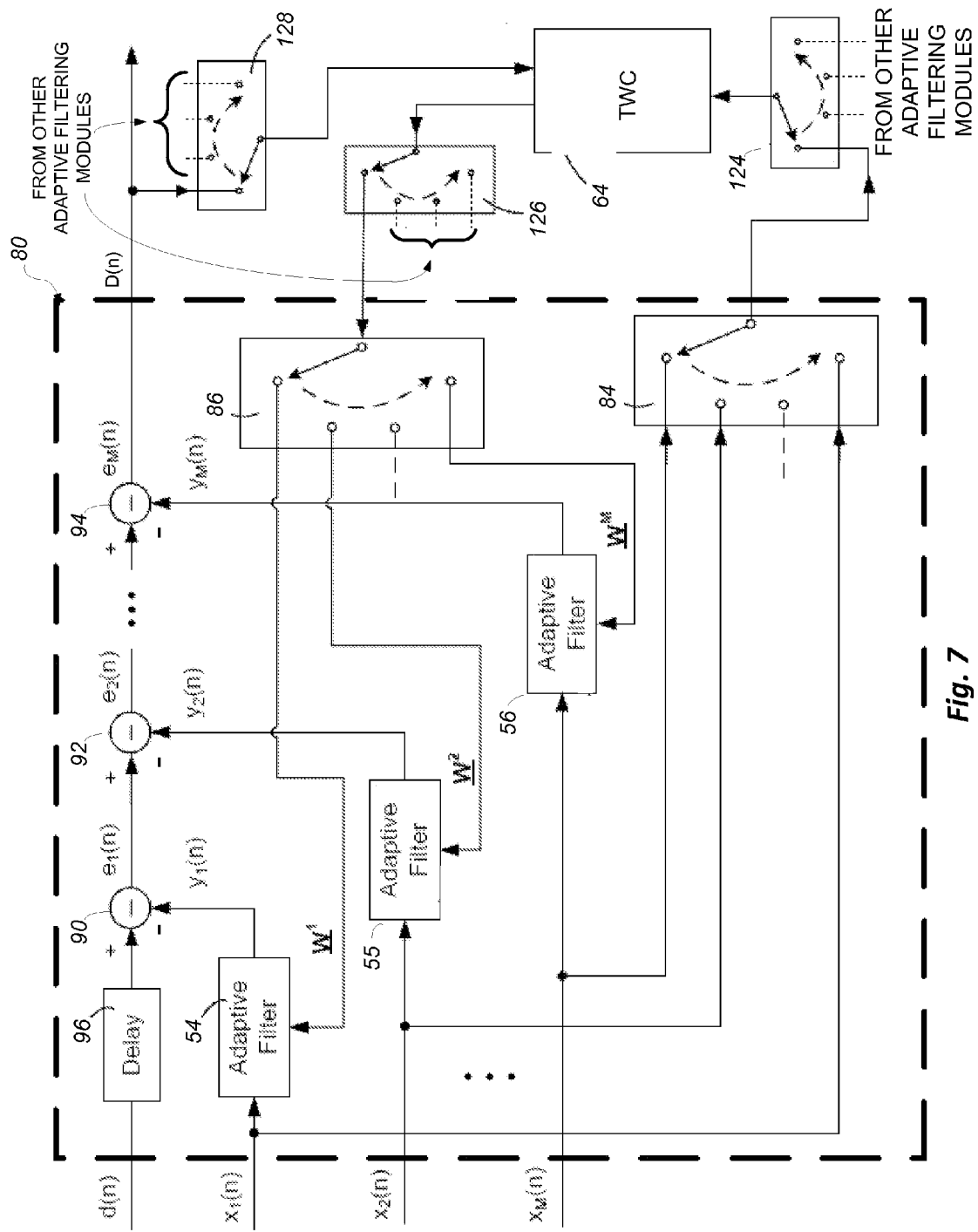
FIG. 7 illustrates the details of one particular adaptive filter module in the context of a plurality of desired signals.

FIG. 7 shows the details of one embodiment of an adaptive filter module 80 when used with a plurality of other adaptive filter modules of the type shown in FIG. 6 It should be noted that the adaptive filter module 80 of FIG. 7 may be identical to that of FIG. 3; however, the embodiment of FIG. 7 includes a coupling of the adaptive filter module 80 to the multiplexers 124, 126, and 128 of FIG. 6 The multiplexers inside adaptive filter module 80 are clocked synchronously at one rate (e.g., the rate at which the TWV components $W^1, W^2, \ldots, W^M$ are updated). The multiplexers 124, 126, and 128 outside of the adaptive filter module 80 are synchronously clocked, but at a different rate than the multiplexers 84, ..., 86 inside the adaptive filter module 80 (e.g., the rate at which the processing individual desired signals D(n) are updated).

Figure 8:
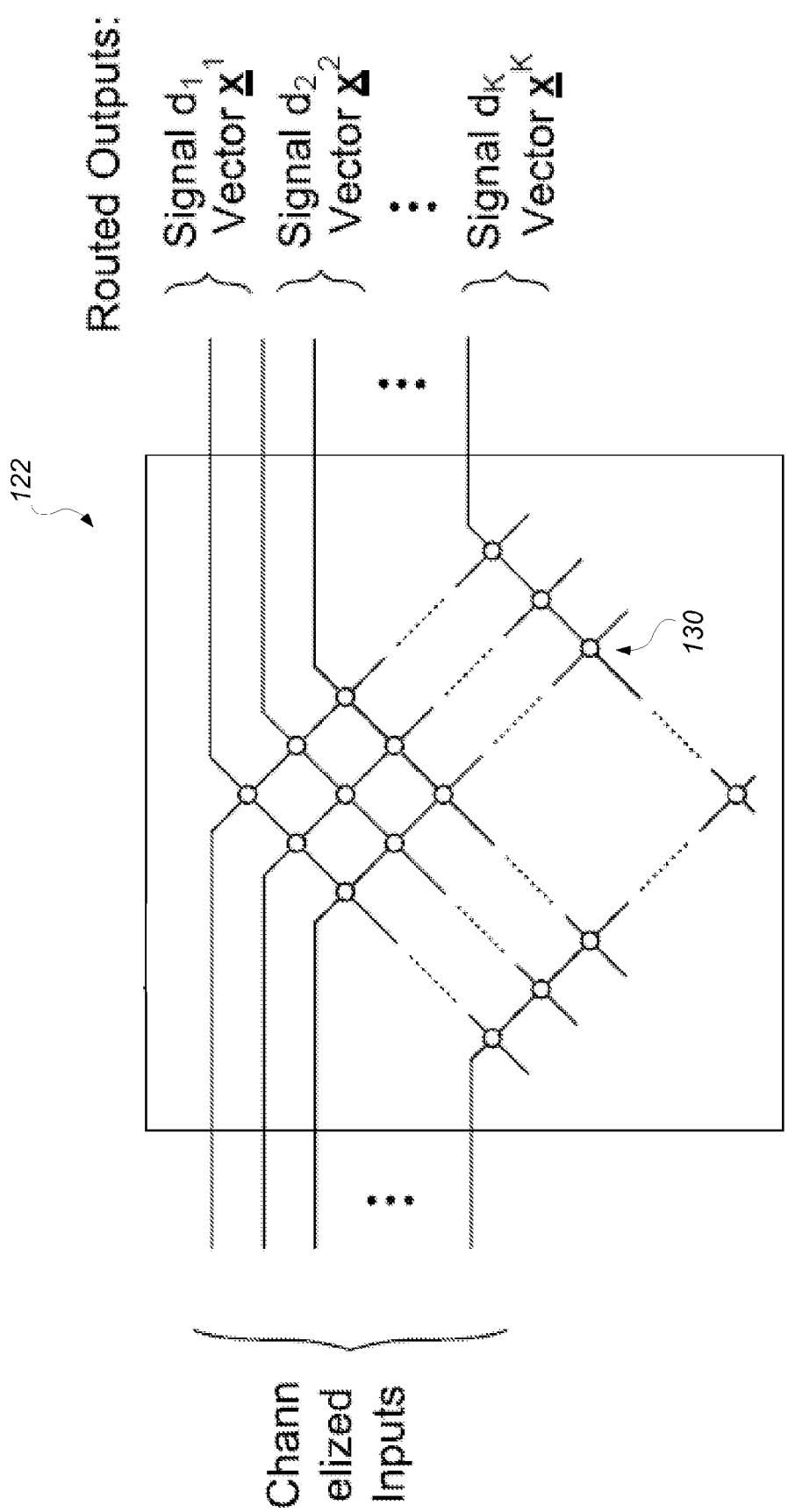
FIG. 8 is an electrical schematic diagram illustrating an example of an embodiment of a digital switch matrix.

FIG. 8 shows an example embodiment of a digital switch matrix 122 that may be used in the circuit of FIG. 6. As noted above, the digital switch matrix routes desired and interference signals to the processing adaptive filter modules $80^1$, $80^2, \ldots, 80^K$ 150. The digital switch matrix operates by allowing any input to be connected to one or more outputs simultaneously. However, each output can be connected to only one input at a time. A series of cross-point switches 130 allows each input to be connected to one output. Sixteen such cross-point switches 130 are shown in FIG. 8; however, it should be understood that the number of such cross-point switches is K times the number of channelized inputs, where K is the number of desired channels from which interference is to be cancelled.

Figure 9:
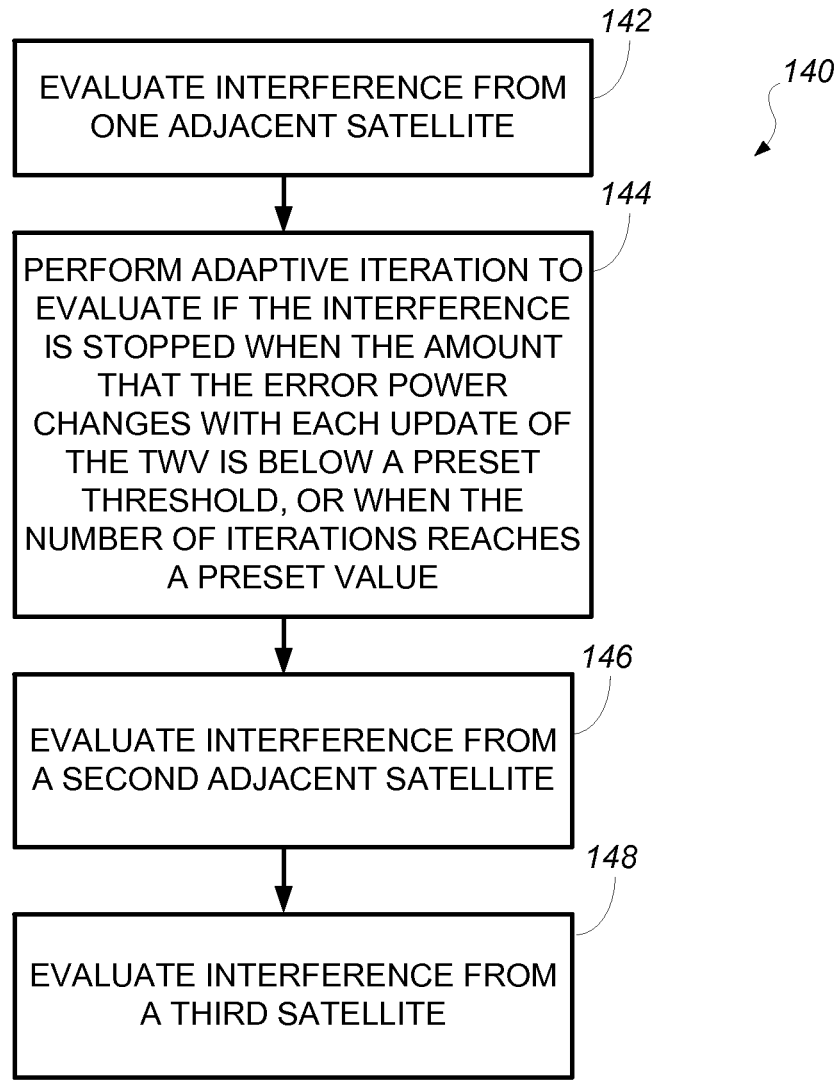
FIG. 9 is a flow diagram of an embodiment of a method for determining which satellite signals are interfering and need to be cancelled.

FIG. 9, to which reference is now made, is a flow diagram 140 of an embodiment of a method for determining which satellites are interfering, i.e. which sources need to be cancelled. In this embodiment, the interference from one adjacent satellite is initially evaluated, box 142. An adaptive iteration process is used to evaluate whether the interference is stopped when the amount that the error power changes with each update of the TWV is below a preset threshold, or when the number of iterations reaches a preset value, box 144. Both the threshold for the change in error power and the number of iterations may be programmable. These two parameters can be used either alternatively or concurrently. Next, the interference from a second adjacent satellite is evaluated, box 146. Next, the interference from a third satellite is evaluated, box 148, and so on.

Figure 10:
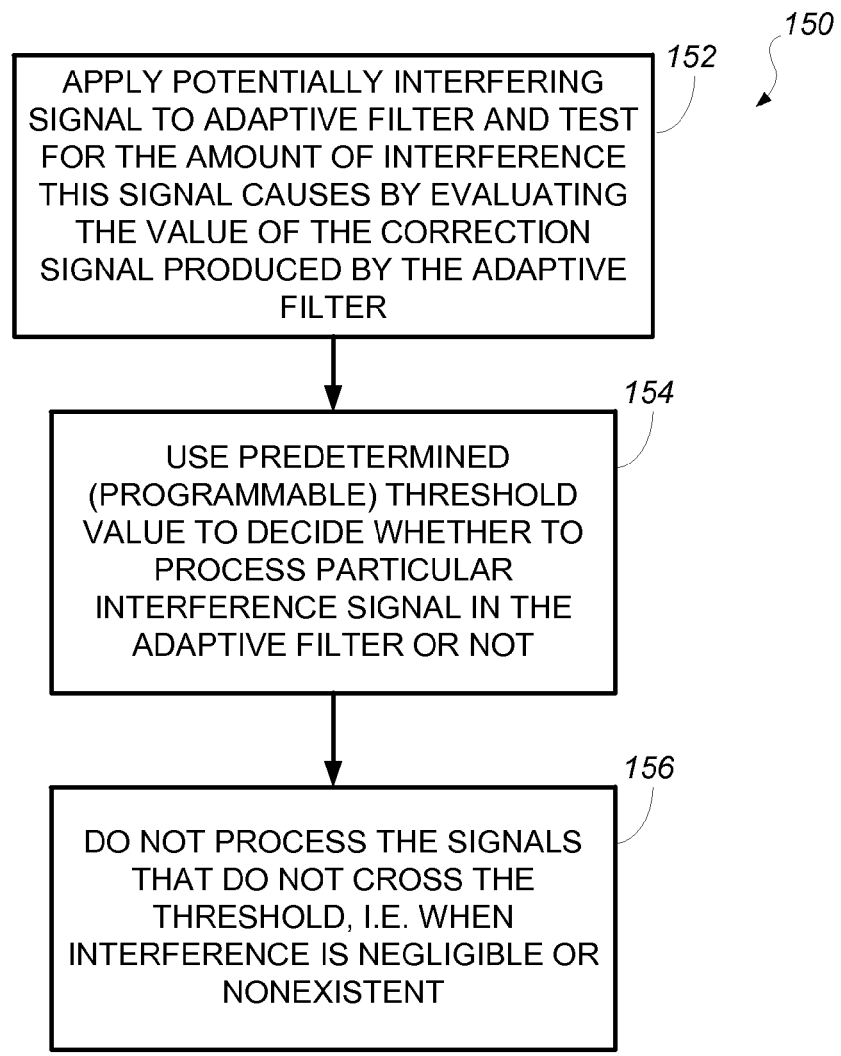
FIG. 10 is a flow diagram illustrating embodiment of a method for testing for the amount of interference inflicted on the desired signal by the undesired signals.

FIG. 10, to which reference is now additionally made, is a flow diagram 150, illustrating another embodiment. In this embodiment, interfering signals are applied to an adaptive filter 80 and tested for the amount of interference they inflict on the desired signal, box 152. A predetermined (programmable) threshold value may be used as a criteria to decide whether to process particular interference signal in the adaptive filter or not, box 154. Signals that do not cross the threshold, i.e. when interference is negligible or nonexistent, are disconnected from the filter, box 156, thus reducing the power and processing time of the computations.

Figure 11:
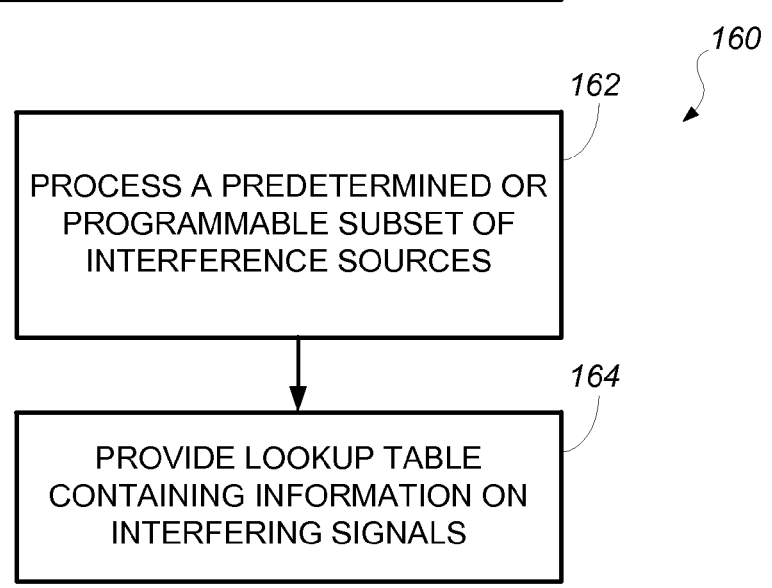
FIG. 11 is a flow diagram illustrating yet another embodiment in which a predetermined or programmable subset of interference sources are processed.

FIG. 11 is a flow diagram 160 illustrating yet another embodiment in which a predetermined or programmable subset of interference sources are processed, box 162. A lookup table, for example, may be used with stored information on interfering signals may be used, box 164.

Figure 12:
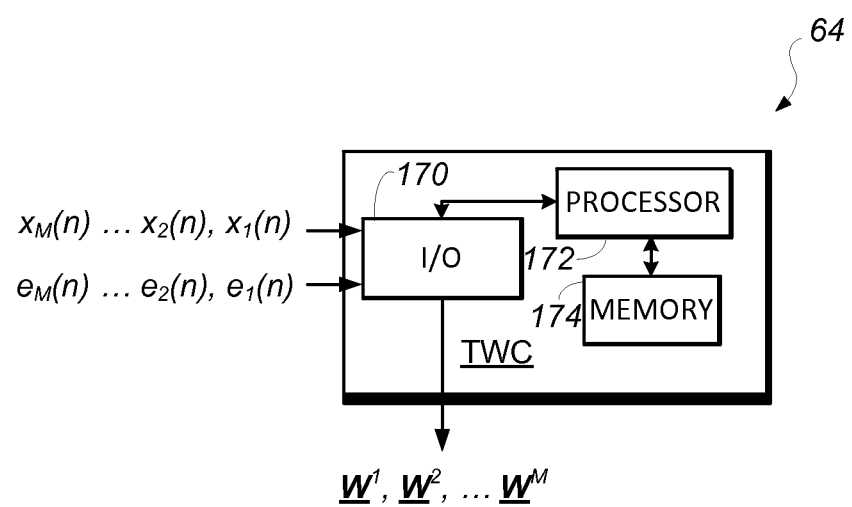
FIG. 12 is a block diagram illustrating one implementation of a tap-weight computer.

FIG. 12 is a block diagram illustrating one implementation of a TWC 64. In the implementation of FIG. 12, the TWC 62 includes an input/output section 170 to receive at least the error-corrected signals $e_1(n), e_2(n), \ldots, e_M(n)$ and the input signals $x_1(n), x_2(n), \ldots, x_m(n)$, and to deliver the TWV components $W^1, W^2, \ldots, W^M$. The input and output signals are processed by a processor 172 in conjunction with a memory 174. The memory 174 may contain computer program steps to perform the methods and to produce the signals in a manner as described above. The term processor is intended to encompass any processing device capable of operating the system or parts thereof. This includes microprocessors, microcontrollers, embedded controllers, application-specific integrated circuits (ASICs), digital signal processors (DSPs), state machines, dedicated discrete hardware, or the like. It is not intended that the processor be limited to any particular type of hardware component implementation. For example, these devices may also be implemented as combinations of computing devices, for example, a combination of a DSP and a microprocessor, a plurality of microprocessors, one or more microprocessors in conjunction with a DSP core, or any other such configuration. Moreover, the processing and controlling devices need not be physically collocated with the part of the system it serves. For example, a central processing unit or programmed computer may be associated with and appropriately connected to each of the various components of the system to perform the various actions described herein.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. A system for reducing interference in a system output signal between a plurality of desired satellite-signal and a plurality of undesired satellite-signals contained in a received signal, comprising:
   a) a tap-weight computer (TWC) for receiving said system output signal and said undesired satellite-signals for producing a plurality of tap-weight vectors (TWVs), each TWV corresponding to one of said undesired satellite-signals;
   b) a plurality of adaptive filter modules, each including:
      a. a plurality of adaptive filters, each including:
         i. a register into which a corresponding TWV is coupled,
         ii. a tapped delay line through which a corresponding undesired satellite-signal is clocked, said tapped delay line having a plurality of outputs, each output representing a term of said corresponding undesired satellite-signal, each output being delayed a predetermined number of clock cycles from a next preceding output,
         iii. a plurality of multipliers connected to produce a product of a term of said corresponding TWV in said register and a respective one of said plurality of outputs to produce an output product, and
         iv. an adder to sum said output products to produce an error-correcting signal output,
      b. a plurality of subtractors for subtracting from said desired satellite-signal said error-correcting signal outputs of said plurality of adaptive filters to provide said system output signal, wherein said TWC uses an algorithm to cause said TWVs to reduce interference from said undesired satellite-signals in said system output signal; and
      c. first, second, and third multiplexers, wherein said TWVs are coupled to said registers by said first multiplexer, wherein said undesired satellite-signals are multiplexed into said TWC by said second multiplexer, said first and second multiplexers being synchronized whereby a TWV is coupled to a register containing the undesired satellite-signal to which said TWV corresponds, and wherein said undesired satellite-signal to which said TWV corresponds is multiplexed into said TWC by said third multiplexer;

c) fourth, fifth, and sixth multiplexers wherein said TWVs are coupled to said first multiplexer by said fourth multiplexer, wherein said undesired satellite-signals are multiplexed into said TWC by said fifth multiplexer through said second multiplexer, said first, second, fourth, and fifth multiplexers being synchronized whereby a TWV is coupled to registers containing the undesired satellite-signals to which said TWV corresponds, and wherein said undesired satellite-signal to which said TWV corresponds is multiplexed into said TWC by said sixth multiplexer through said third multiplexer.

2. The system of claim 1 wherein said algorithm is a least-mean-square algorithm.

3. The system of claim 1 further comprising a delay element in an input path of said received signal in each of said adaptive filter modules.

4. The system of claim 3 wherein said delay element introduces a delay to said received signal that approximately matches a delay introduced by said plurality of adaptive filters in a respective adaptive filter module.

* * * * *